US010554853B2

(12) United States Patent
Yoshimi

(10) Patent No.: US 10,554,853 B2
(45) Date of Patent: Feb. 4, 2020

(54) INFORMATION PROCESSING DEVICE, INFORMATION PROCESSING METHOD, INFORMATION PROCESSING SYSTEM, AND NON-TRANSITORY RECORDING MEDIUM

(71) Applicant: Shun Yoshimi, Kanagawa (JP)

(72) Inventor: Shun Yoshimi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/268,799

(22) Filed: Feb. 6, 2019

(65) Prior Publication Data

US 2019/0289165 A1     Sep. 19, 2019

(30) Foreign Application Priority Data

Mar. 19, 2018  (JP) ................................. 2018-051780
Sep. 28, 2018  (JP) ................................. 2018-185962

(51) Int. Cl.
*H04N 1/327*      (2006.01)
*H04L 12/24*      (2006.01)
*H04N 1/00*       (2006.01)

(52) U.S. Cl.
CPC ......... *H04N 1/32776* (2013.01); *H04L 41/12* (2013.01); *H04N 1/00474* (2013.01); *H04N 1/00477* (2013.01); *H04N 1/00493* (2013.01); *H04N 2201/0036* (2013.01); *H04N 2201/0075* (2013.01); *H04N 2201/0094* (2013.01)

(58) Field of Classification Search
None
See application file for complete search history.

(56) References Cited

U.S. PATENT DOCUMENTS

2015/0031404 A1* 1/2015 Yada ..................... H04W 76/25
455/508
2017/0322759 A1* 11/2017 Tokuchi ............... H04N 1/4433

FOREIGN PATENT DOCUMENTS

| JP | 2012-203430 | 10/2012 |
| JP | 2014-042130 | 3/2014 |
| JP | 2014-049910 | 3/2014 |

* cited by examiner

*Primary Examiner* — Lennin R Rodriguezgonzalez
(74) *Attorney, Agent, or Firm* — Harness, Dickey and Pierce, P.L.C.

(57) ABSTRACT

An information processing device includes a memory and a processor. The memory stores a first application and a second application. The processor activates the second application in response to an activation instruction to activate the second application. The processor executes the first application to display, on a display, a first screen for receiving an input for connecting the information processing device to a communication target device, in response to the activation instruction to activate the second application, while the information processing device is disconnected from the communication target device. The processor executes the first application to establish a communication connection with the communication target device based on the input received on the first screen. The processor executes the second application to display, on the display, a second screen for performing processing of the second application after the communication connection is established with the communication target device.

13 Claims, 11 Drawing Sheets

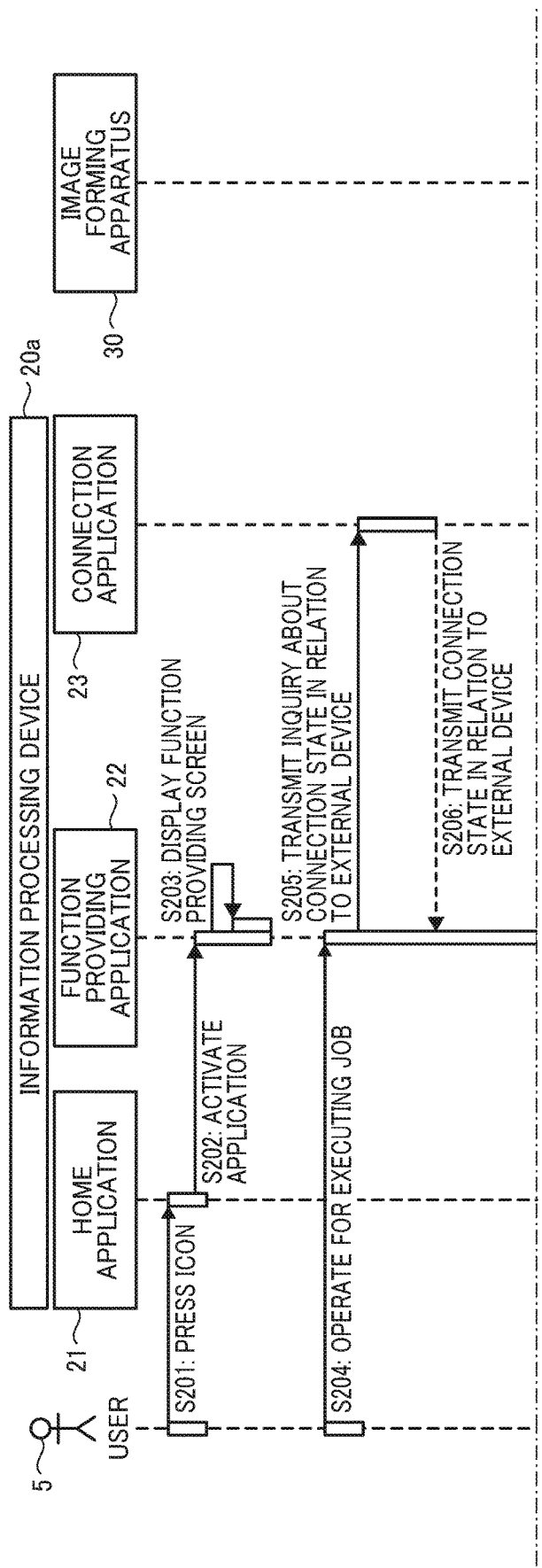

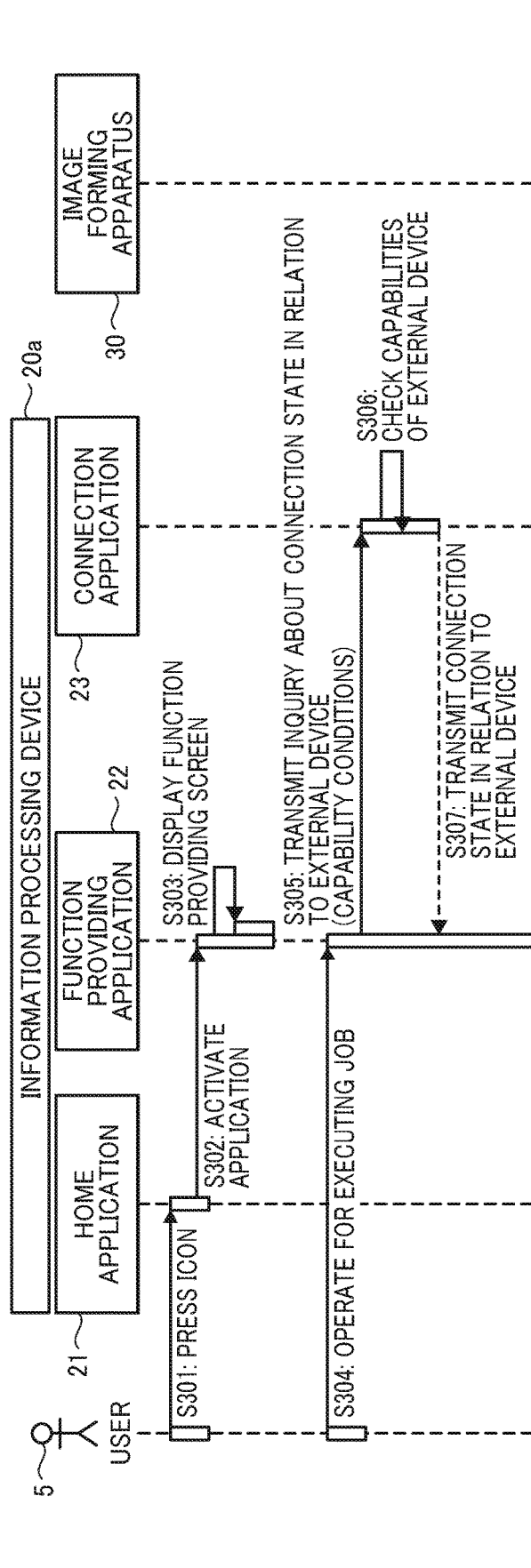

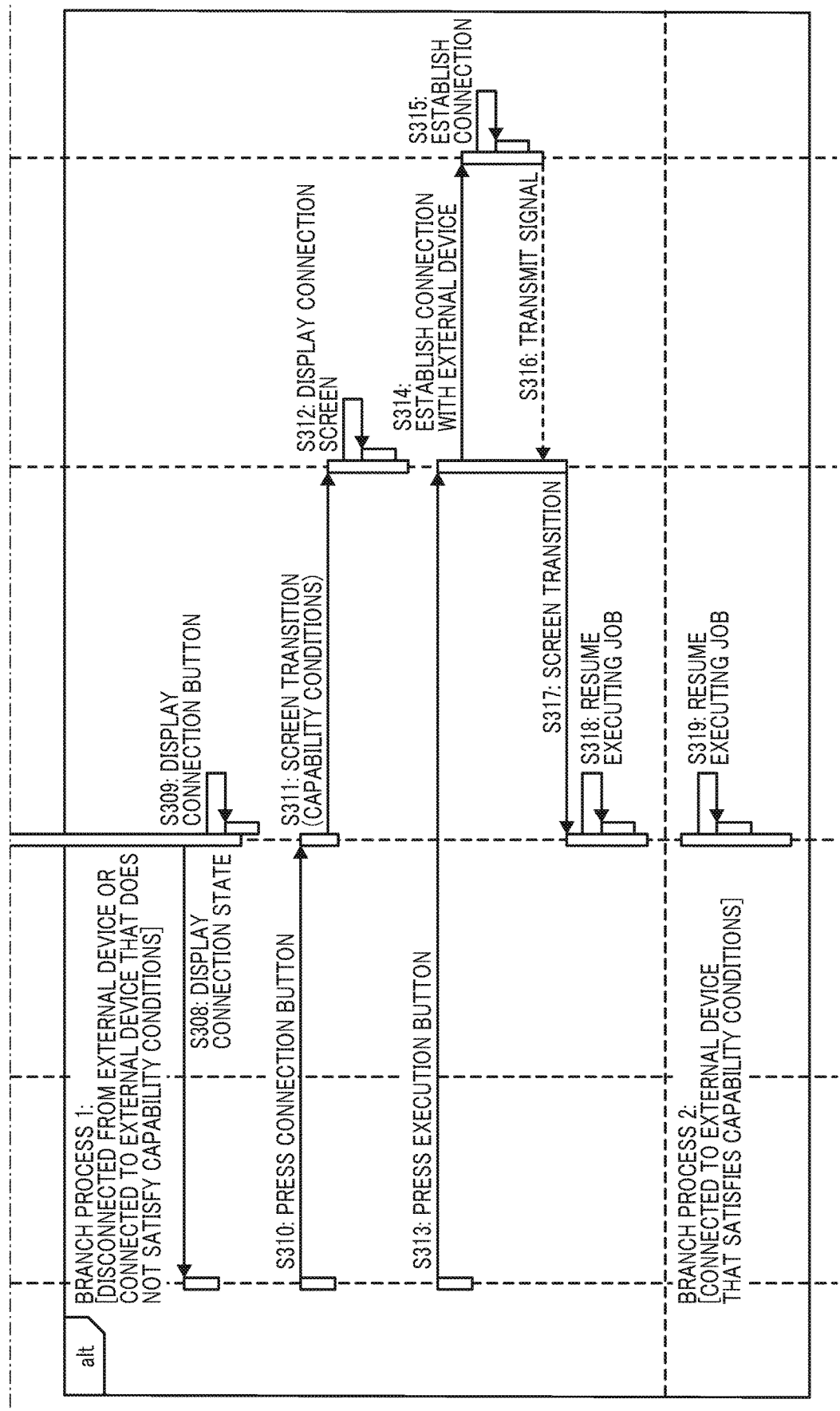

| JOB NAME | FUNCTION | TYPE OF SHEET |
|---|---|---|
| J01 | SCAN | – |
| J02 | FAX | B5 |
| J03 | PRINT | A3 |
| ⋮ | ⋮ | ⋮ |

# INFORMATION PROCESSING DEVICE, INFORMATION PROCESSING METHOD, INFORMATION PROCESSING SYSTEM, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2018-051780, filed on Mar. 19, 2018, and 2018-185962, filed on Sep. 28, 2018, in the Japan Patent Office, the entire disclosures of which are hereby incorporated by reference herein.

BACKGROUND

Technical Field

The present disclosure relates to an information processing device, an information processing method, an information processing system, and a non-transitory recording medium storing instructions for executing an information processing method.

Related Art

A control device of an image forming apparatus, such as a Multifunction Peripheral (MFP), receives a user input and executes processing to use a function of the image forming apparatus. In addition, an information processing device communicably connected to the image forming apparatus is operated by a user to use a function of the image forming apparatus.

SUMMARY

An exemplary embodiment of the present disclosure includes an information processing device including a memory and a processor. The memory stores a first application and a second application. The processor activates the second application in response to an activation instruction to activate the second application. The processor executes the first application to display, on a display, a first screen for receiving an input for connecting the information processing device to a communication target device, in response to the activation instruction to activate the second application, while the information processing device is disconnected from the communication target device. The processor executes the first application to establish a communication connection with the communication target device based on the input received on the first screen. The processor executes the second application to display, on the display, a second screen for performing processing of the second application after the communication connection is established with the communication target device.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 10A and FIG. 10B (FIG. 10) are a sequence diagram illustrating an example of a processing flow of checking a connection, according to a second embodiment of the disclosure;

FIG. 11A and FIG. 11B (FIG. 11) are a sequence diagram illustrating an example of a processing flow of checking a connection, according to a third embodiment of the disclosure;

Figure 1:
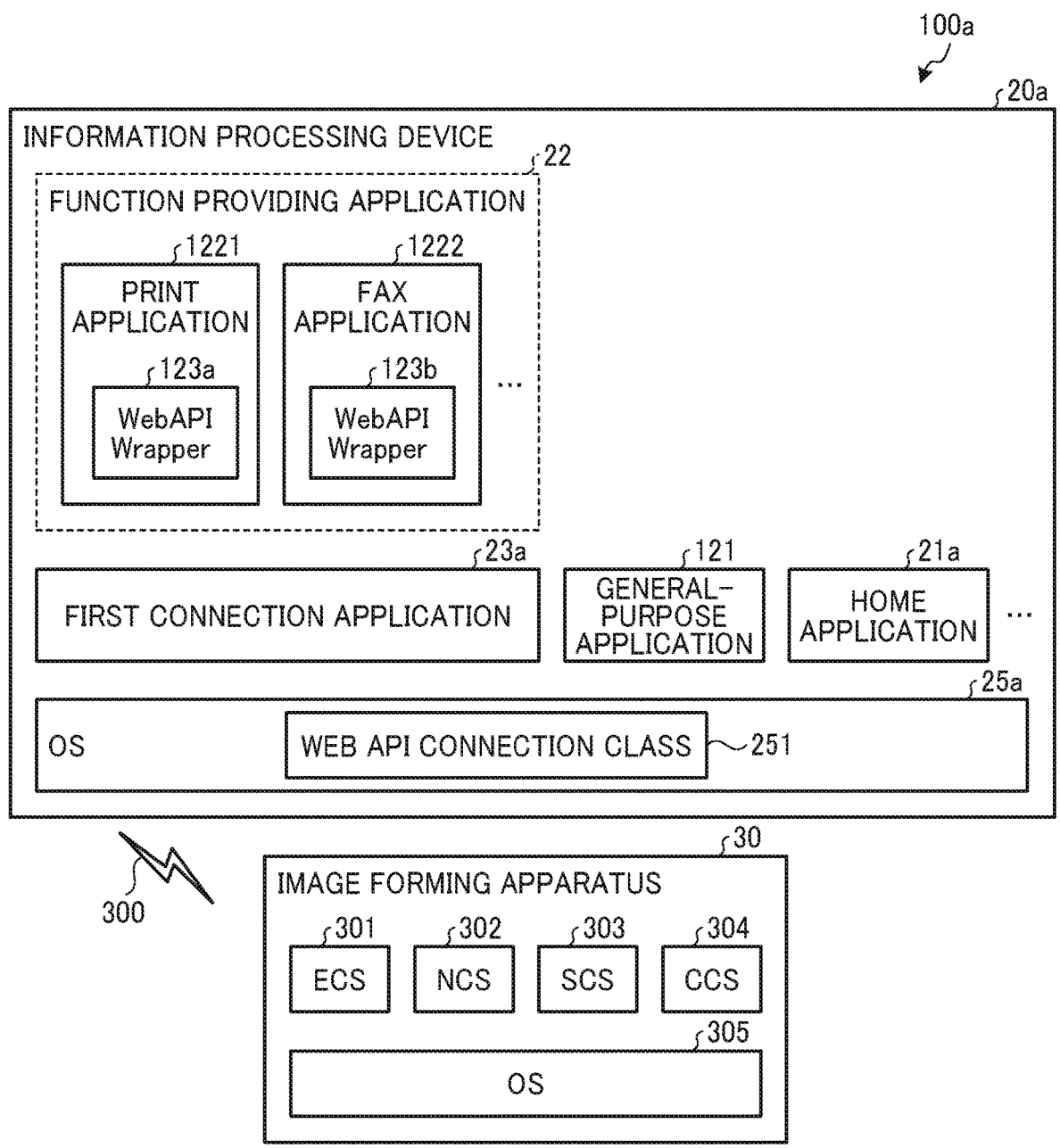
FIG. 1 is a block diagram illustrating an example of an overall configuration of an information processing system according to a first embodiment of the disclosure.

The accompanying drawings are intended to depict example embodiments of the present disclosure and should not be interpreted to limit the scope thereof. The accompanying drawings are not to be considered as drawn to scale unless explicitly noted.

DETAILED DESCRIPTION

The terminology used herein is for describing particular embodiments only and is not intended to be limiting of the present disclosure. As used herein, the singular forms "a", "an" and "the" are intended to include the plural forms as well, unless the context clearly indicates otherwise. It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof. In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operation in a similar manner, and achieve a similar result.

Hereinafter, a description is given of several embodiments of an information processing device, an information processing method, an information processing system, an image forming system, and a non-transitory recording medium, with reference to the attached drawings.

First Embodiment

FIG. 1 is a block diagram illustrating an example of an overall configuration of an information processing system 100a according to a first embodiment. As illustrated in FIG. 1, the information processing system 100a includes an information processing device 20a and an image forming apparatus 30.

The image forming apparatus 30 is, for example, a Multifunction Peripheral (MFP), and has functions such as a copying function, a scanning function, a facsimile communication function, and a printing function. Hereinafter, hardware, such as a plotter and a scanner, and software that execute various kinds of processing such as copying, scanning, facsimile communication, and printing are collectively referred to as an execution unit for executing each kind of processing. The image forming apparatus 30 receives, from the information processing device 20a, an execution instruction on processing to be executed via a wireless network 300, and the execution unit executes the processing based on the received execution instruction. In addition, the image forming apparatus 30 according to the present embodiment includes a fixed control device 20b, which is attached to a body of the image forming apparatus 30. The image forming apparatus 30 and the fixed control device 20b are described later in detail with reference to FIG. 2.

An example of the information processing device 20a is an information processing terminal such as a tablet terminal or a smartphone (smart terminal, smart device). As illustrated in FIG. 1, the information processing device 20a includes an operating system (OS) 25a, a first connection application 23a, a function providing application 22, a general-purpose application 121, and a home application 21a.

The OS 25a is an operating system that provides an interface between hardware and various kinds of software. An example of the OS 25a is Android (registered trademark). In addition, the OS 25a has a web application programming interface (API) connection class 251 as a function. The web API connection class 251 may be implemented by software that is different from the OS 25a. In addition, the OS 25a may include various applications required for the system operation of the information processing device 20a.

The general-purpose application 121 is an application that is executable on the information processing device 20a. Examples of the general-purpose application 121 include an image processing application and a mail application. In addition, the information processing device 20a can install a plurality of general-purpose applications 121. Each of the plurality of general-purpose applications 121 has a function, and the functions of the plurality of general-purpose applications 121 may be different from each other.

In addition, the home application 21a may be one of the general-purpose applications 121. The home application 21a displays a main screen on a display of the information processing device 20a. The home application 21a activates the function providing application 22 or the general-purpose application 121, according to a user operation of pressing a corresponding icon on the main screen to select the function providing application 22 or the general-purpose application 121. Here, pressing any icon or button means any operations made by a user to select the icon or button, for example, tapping the icon or button and clicking the icon or button.

The home application 21a activates the function providing application 22 or the general-purpose application 121 by transmitting, to the function providing application 22 or the general-purpose application 121, an instruction signal instructing the activation, for example.

In addition, the user may directly activate desired one of the function providing applications 22 and the general-purpose applications 121 without using the home application 21a, or may activate the desired one of the function providing applications 22 from another one of the function providing applications 22 and the general-purpose applications 121. In addition, the home application 21a may display only the function providing application 22 on the main screen. In addition, instead of providing the home application 21a, the first connection application 23a or the function providing application 22 may have the function of the home application 21a, for example.

Figure 2:
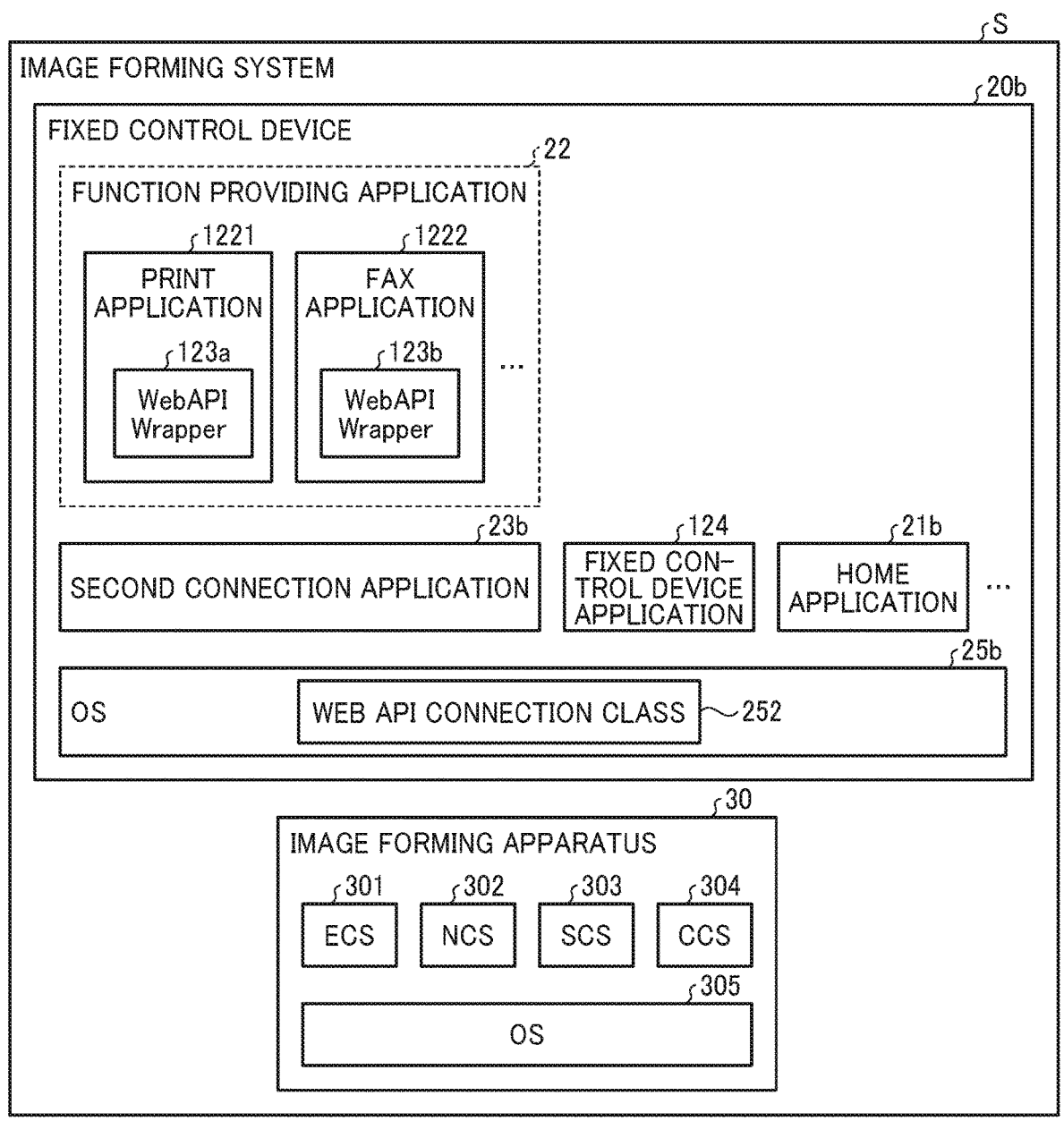
FIG. 2 is a block diagram illustrating an example of an overall configuration of an image forming system according to the first embodiment of the disclosure.

The function providing application 22 is an application that is generated in a manner that is executed on both the information processing device 20a and the fixed control device 20b, which is illustrated in FIG. 2, of the image forming apparatus 30. A plurality of function providing applications 22 can be installed on the information processing device 20a and the fixed control device 20b.

Each of the plurality of function providing applications 22 has a function, and the functions of the plurality of function providing applications 22 may be different from each other. For example, when a communication target device of the information processing device 20a is the image forming apparatus (MFP) 30, the function providing application 22 is, for example, an application that provides a user interface screen for setting and instructing in relation to a corresponding function, such as copying, scanning, printing, or facsimile communication, executed with the MFP.

In the example of FIG. 1, as examples of the function providing application 22, a print application 1221 and a facsimile communication (fax) application 1222 are used. For example, the print application 1221 and the fax application 1222 provide a user interface screen for setting and instructing in relation to the printing function of the image forming apparatus 30 and the facsimile communication function of the image forming apparatus 30, respectively.

In addition, each function providing application 22 includes a web API wrapper 123 (123a, 123b). The web API wrapper 123 is a library that provides a class wrapping the web API connection class 251 so that the function providing application 22 is communicably connected to an image forming apparatus 30 regardless of an operating environment. With this configuration, the function providing application 22 generates an instance of the web API wrapper 123, thereby acquiring information on a communication connection with the image forming apparatus 30 that is currently connected to the information processing device 20a, (for example, a host name of a connection destination, a connection port number of a connection destination, etc.), and transmits a function execution request to the image forming apparatus 30 using the information on the communication connection. Hereinafter, the information on a communication connection is also referred to as communication connection information.

The function providing application 22 may add authentication information (for example, a user identifier (ID) and a password) used for user authentication to the function execution request to be transmitted to the image forming apparatus 30, depending on a terminal device on which the function providing application 22 is installed (information processing device 20a or fixed control device 20b of the image forming apparatus 30). In addition, the function providing application 22 is capable of selectively switching protocols, between Hypertext Transfer Protocol (HTTP) and Hypertext Transfer Protocol Secure (HTTPS), to be used for transmitting the function execution request to the image forming apparatus 30, depending on a terminal device on which the function providing application 22 is installed (information processing device 20a or fixed control device 20b of the image forming apparatus 30). The function providing application 22 may include the web API connection class 251. In addition, the web API connection class 251 may use a function installed on Android (registered trademark) or the like.

The first connection application 23a establishes a communication connection with the image forming apparatus 30. In addition, the first connection application 23a provides, to the web API wrapper 123, the information on the communication connection with the image forming apparatus 30. In addition, the first connection application 23a may have a function of generating a home screen for displaying a list of icons of the function providing applications 22 installed on the information processing device 20a. In addition, the first connection application 23a may have a function of displaying a screen for selecting one of the plurality of image forming apparatuses 30 to be connected to the information processing device 20a, or a screen for receiving authentication information required for logging in to the selected one of the image forming apparatuses 30. The first connection application 23a is an application that is generated in a manner that is installed and operated at least on the information processing device 20a out of the information processing device 20a and the fixed control device 20b, which is described later. For example, the first connection application 23a includes processing unique to the information processing device 20a.

In the example of FIG. 1, the information processing device 20a and the image forming apparatus 30 are communicably connected on a one-to-one basis, namely the information processing device 20a is communicably connected to a single image forming apparatus 30, however, the information processing device 20a can be communicably connected to more than one image forming apparatuses 30 at the same time. In addition, the image forming apparatus 30 can be communicably connected to more than one information processing devices 20a at the same time.

In addition, a user operation in relation to the image forming apparatus 30 may be performed not only using the information processing device 20a but also using the fixed control device 20b of the image forming apparatus 30. A detailed description of the fixed control device 20b of the image forming apparatus 30 is given below.

FIG. 2 is a block diagram illustrating an example of an overall configuration of an image forming system S, which is also an information processing system, according to the first embodiment. As illustrated in FIG. 2, the image forming system S, which is also an information processing system, includes the fixed control device 20b and a main device that is the image forming apparatus 30.

The fixed control device 20b may be detachably provided to the main device (image forming apparatus 30). In addition, the fixed control device 20b may be capable of communicating not only with a single image forming apparatus 30 but also with more than one image forming apparatus 30. For example, in addition to being communicably connected to one of the image forming apparatuses 30 through a signal line, the fixed control device 20b may be wirelessly connected to another one of the image forming apparatuses 30.

The fixed control device 20b includes an OS 25b, a second connection application 23b, the function providing application 22, a fixed control device application 124, and a home application 21b.

The function providing application 22 of the fixed control device 20b and the web API wrapper 123 included in each function providing application 22 of the fixed control device 20b have the same functions as those of the function providing application 22 of the information processing device 20a and the web API wrapper 123 included in each function providing application 22 of the information processing device 20a, respectively. The same function providing application 22 is installable on both the information processing device 20a and the fixed control device 20b.

Functions provided by the second connection application 23b of the fixed control device 20b are almost the same as the functions provided by the first connection application 23a of the information processing device 20a. However, the second connection application 23b includes processing unique to the fixed control device 20b. The second connection application 23b is an application that is generated in a manner that is installed and operated at least on the fixed control device 20b out of the information processing device 20a and the fixed control device 20b. In the following description, when being unnecessary to distinguish from each other, the first connection application 23a and the second connection application 23b are collectively or individually referred to as (a) connection application(s) 23.

The OS 25b is an operating system that provides an interface between hardware and various kinds of software. An example of the OS 25b is Android (registered trademark). In addition, the OS 25b has a web API connection class 252 as a function.

Functions provided by the web API connection class 252 are almost the same as the functions provided by the web API connection class 251 of the information processing device 20a. However, the web API connection class 252 includes processing unique to the fixed control device 20b. The web API connection class 252 may be implemented by software that is different from the OS 25b. Thus, the OS 25b may be an OS that is customized for operating the fixed control device 20b or may include various applications required for the system operation of the fixed control device 20b.

The fixed control device application 124 is an application that is dedicated to the fixed control device 20b. For example, when a communication target device of the fixed control device 20b is the image forming apparatus (MFP) 30, the fixed control device application 124 is, for example, an application that provides a user interface screen for setting and instructing in relation to a corresponding function, such as copying, scanning, printing, or facsimile communication, executed with the MFP. The fixed control device 20b may have a fixed control device platform to execute the fixed control device application 124. When the fixed control device 20b has the fixed control device platform, the fixed control device platform may include a part or all of the functions of the second connection application 23b or may be provided separately from the second connection application 23b.

As illustrated in FIG. 1 and FIG. 2, the image forming apparatus 30 includes an OS 305, an engine control service (ECS) 301, a network control service (NCS) 302, a system control service (SCS) 303, and a certification control service (CCS) 304.

The OS 305 is an independent OS that is different from the OS 25a of the information processing device 20a and the OS 25*b* of the fixed control device 20*b*. The OS 305 provides an interface between hardware and various kinds of software.

The ECS 301 manages and arbitrates hardware of an image engine including a plotter and a scanner, for example.

The NCS 302 manages and arbitrates hardware of a network interface (I/F) of the image forming apparatus 30, and receives web API requests (for example, HTTP requests, HTTPS requests, etc.) from the web API connection classes 251 and 252.

The SCS 303 manages operation of the overall system, such as restoration from an energy saving mode and job management. In addition, the SCS 303 controls a counter, screen, and settings of the main device (image forming apparatus 30) and the fixed control device 20*b*, for example.

The CCS 304 manages user authentication, authentication status, and usage restriction of the main device (image forming apparatus 30) and the fixed control device 20*b*.

Each of the ECS 301, the NCS 302, the SCS 303, the CCS 304, and the image engine is an example of implementing a functional unit to execute a function. In addition to the above, there may be a functional unit that includes software or is implemented by hardware, for providing each function, such as copying, scanning, printing, or facsimile communication, for example.

The image forming apparatus 30 is an example of the communication target device that is communicably connected to the information processing device 20*a* or the fixed control device 20*b*. The communication target device is not limited to the image forming apparatus 30, and various electronic apparatuses such as an electronic whiteboard and an office apparatus including a projector may be used as the communication target devices.

In the present embodiment, as illustrated in FIG. 1 and FIG. 2, the function providing application 22 and the connection application 23 are separately provided in the information processing device 20*a* and the fixed control device 20*b*. The function providing application 22 is often generated by a third-party that is different from a manufacturer that manufactures a device such as the image forming apparatus 30. Accordingly, as in the present embodiment, the connection application 23 provided separately from the function providing application 22 establishes a connection with the image forming apparatus 30, so that the function providing application 22 can provide the function without having a connection function of connecting to the image forming apparatus 30. This allows a third-party designer of the function providing application 22 to generate the function providing application 22 more easily.

In addition, each connection application 23 (first connection application 23*a* or second connection application 23*b*) includes the processing unique to the corresponding device (information processing device 20*a* or fixed control device 20*b*) in relation to connecting to the image forming apparatus 30. For this reason, the function providing application 22 does not need to include the processing unique to each device (information processing device 20*a* or fixed control device 20*b*). That is, the function providing application 22 is common to both of the devices (information processing device 20*a* and fixed control device 20*b*). Namely, there is no need to generate the function providing application 22 for each device, resulting in simplification in generating the function providing application 22 for the designer of the function providing application 22.

Each of the functions of one of the information processing device 20*a* and the fixed control device 20*b* described above is implemented, for example, by a central processing unit (CPU) executing a program stored in a read only memory (ROM) or a hard disk drive (HDD) on the corresponding one of the information processing device 20*a* and the fixed control device 20*b*. The program executed by the CPU may be provided in (installed on) the information processing device 20*a* and the fixed control device 20*b* in advance or provided in (installed on) the information processing device 20*a* and the fixed control device 20*b* from the external to the information processing device 20*a* or the fixed control device 20*b*. When the program is provided from the outside of the information processing device 20*a* or the fixed control device 20*b*, a recording medium, such as universal serial bus (USB) memory, a memory card, and compact disc read only memory (CD-ROM), storing the program may be provided, or the program may be downloaded from a server on a network, such as the Internet.

The present embodiment is further described in detail below. In the following description, the information processing device 20*a* is used as an example, however, the same operation as the information processing device 20*a* can be also performed by the fixed control device 20*b*. In addition, the following description can be applied to the fixed control device 20*b* instead of the information processing device 20*a*.

Figure 3:
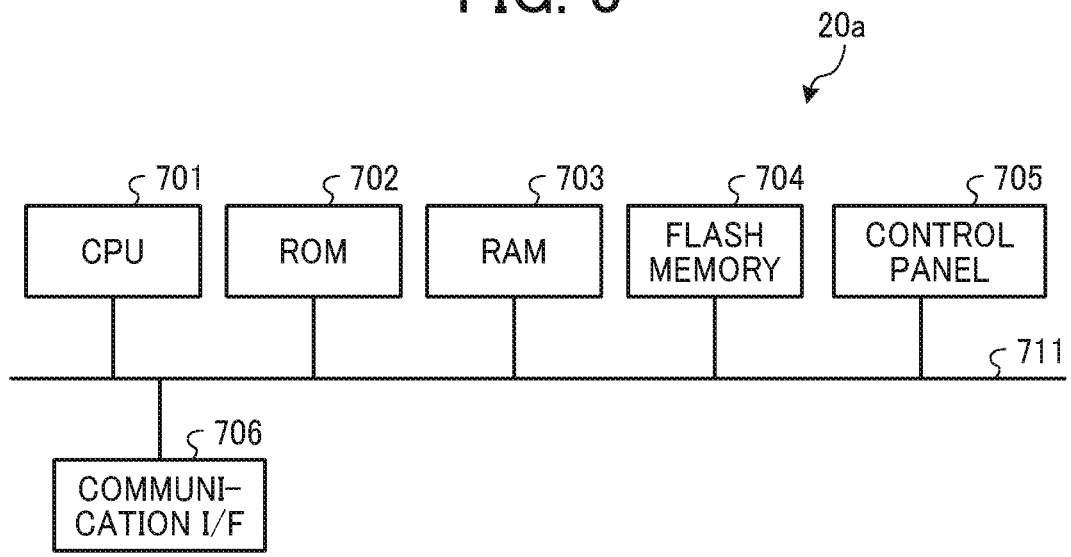
FIG. 3 is a block diagram illustrating an example of a hardware configuration of an information processing device according to the first embodiment of the disclosure.

FIG. 3 is a block diagram illustrating an example of a hardware configuration of the information processing device 20*a*. As illustrated in FIG. 3, the information processing device 20*a* includes a CPU 701, a ROM 702, a random access memory (RAM) 703, a flash memory 704, a control panel 705, and a communication interface (I/F) 706. A hardware configuration of the fixed control device 20*b* is also substantially the same as that of the information processing device 20*a* illustrated in FIG. 3.

The control panel 705 is, for example, a touch panel display in which a touch panel and a display are combined with each other. In addition, the control panel 705 includes an input unit for inputting an instruction for operating the information processing device 20*a* and a display unit for displaying a processing result of the information processing device 20*a*. The input unit and the display unit may be separately provided.

Figure 4:
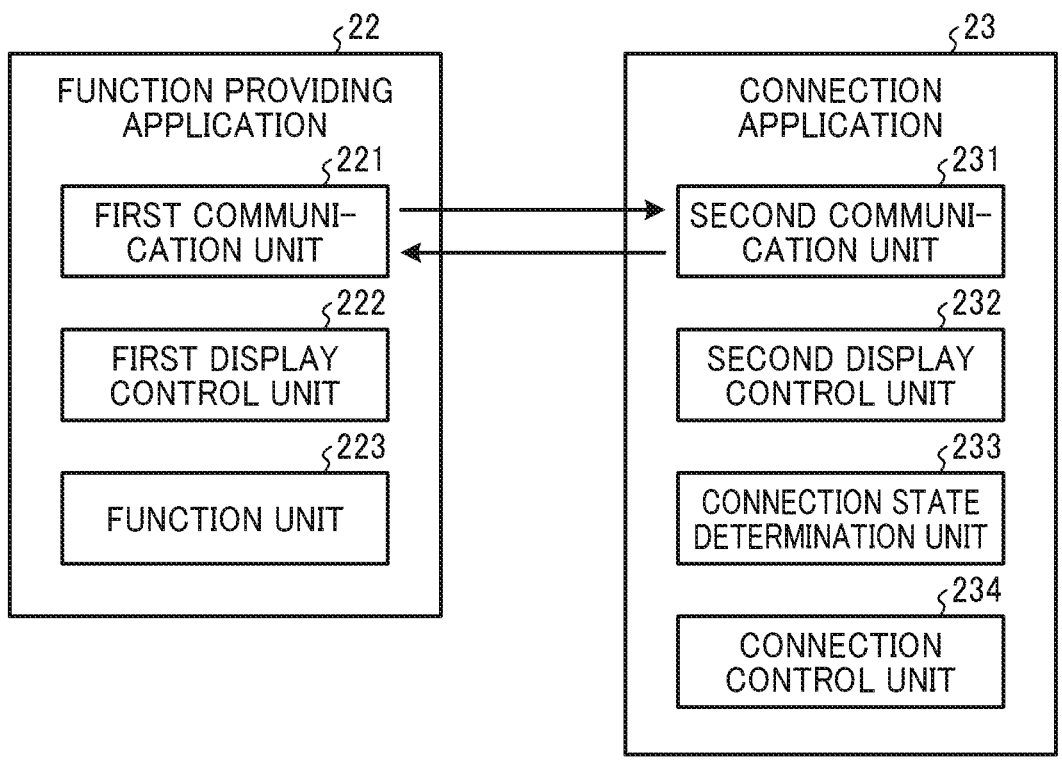
FIG. 4 is a block diagram illustrating an example of functions of a function providing application and a connection application of the information processing device according to the first embodiment of the disclosure.

FIG. 4 is a block diagram illustrating an example of functions of the function providing application 22 and the connection application 23 of the information processing device 20*a* according to the present embodiment. As illustrated in FIG. 4, the function providing application 22 includes a first communication unit 221, a first display control unit 222, and a function unit 223.

The first communication unit 221, the first display control unit 222, and the function unit 223 are functions implemented by the function providing application 22. In particular, a part or all of the functions of the function unit 223 is or are implemented by the web API wrapper 123. In particular, among the functions of the function unit 223, a function of communicating with the image forming apparatus 30 including transmission of a job execution instruction to the image forming apparatus 30 is implemented by the web API wrapper 123. The functions of the first communication unit 221, the first display control unit 222, and the function unit 223 are described below.

The first communication unit 221 communicates with a second communication unit 231 of the connection application 23, which is described later. More specifically, the first communication unit 221 transmits, to the second communication unit 231, an inquiry about a connection state between the information processing device 20*a* and the image forming apparatus 30 and receives the connection state from the second communication unit 231. The connection state between the information processing device 20*a* and the image forming apparatus 30 indicates the presence or absence of a communication connection between the information processing device 20*a* and each image forming apparatus 30. Hereinafter, the inquiry about a connection state between the information processing device 20*a* and the image forming apparatus 30 is also referred to as an inquiry about a connection state in relation to an external device (image forming apparatus 30).

The first display control unit 222 causes the control panel 705 to display a screen. The first display control unit 222 may instruct another piece of software in the information processing device 20*a* to display a screen on the control panel 705. More specifically, the first display control unit 222 displays the connection state between the information processing device 20*a* and the image forming apparatus 30 and displays a user interface, such as a button for establishing a communication connection with the image forming apparatus 30. In addition, the first display control unit 222 can also provide a screen or a user interface related to the functions provided by the function unit 223, which are described later.

The function unit 223 is a unit that provides one or more functions of the function providing application 22. The one or more functions of the function providing application 22 include a function of the image forming apparatus 30. For example, when the function providing application 22 is the print application 1221, the function unit 223 selects a print target, sets printing conditions, and instructs the image forming apparatus 30 to execute printing the print target. In the above example, the functions of the function unit 223 include the print function of the image forming apparatus 30. In addition, the function unit 223 provides a user interface for executing the function. Alternatively, the user interface may be provided by the first display control unit 222. In addition, the function unit 223 may use a function of another piece of software on the information processing device 20*a* to implement each function. In the present embodiment, the user interface capable of executing the function of the function unit 223 is also referred to as a function providing screen. A detailed description of the function providing screen is deferred. In addition, the function unit 223 instructs the image forming apparatus 30 to execute a corresponding function, such as a printing function, directly or via another piece of software such as the connection application 23.

The connection application 23 includes the second communication unit 231, a second display control unit 232, a connection state determination unit 233, and a connection control unit 234.

The second communication unit 231 communicates with the first communication unit 221 of the function providing application 22. More specifically, the second communication unit 231 receives, from the first communication unit 221, the inquiry about the connection state between the information processing device 20*a* and the image forming apparatus 30 and transmits the connection state to the first communication unit 221 in response to the inquiry.

The second display control unit 232 causes the control panel 705 to display a screen. In addition, the second display control unit 232 may instruct another piece of software on the information processing device 20*a* to display a screen. More specifically, the second display control unit 232 displays the connection state between the information processing device 20*a* and the image forming apparatus 30, a user interface for establishing a communication connection with the image forming apparatus 30, or a user interface for selecting one of the image forming apparatuses 30 to be connected. In the present embodiment, when an instruction to activate the function providing application 22 is received from the user and when a communication connection with the communication target device is not established, the second display control unit 232 causes the control panel 705 to display a connection screen for receiving an input operation for connecting to the communication target device. Hereinafter, the instruction to activate the function providing application 22 is also referred to as an activation instruction. A detailed description of the connection screen is deferred.

The connection state determination unit 233 determines a connection state, namely determines whether the connection state between the information processing device 20*a* and the image forming apparatus 30 indicates that the two are disconnected or connected. For example, when the connection control unit 234 establishes a connection with the image forming apparatus 30, the connection state determination unit 233 stores information on the image forming apparatus 30 connected (connection target device), the connection state, and other information on the connection. In addition, the connection state determination unit 233 determines a connection state between the information processing device 20*a* and the image forming apparatus 30 based on the stored information.

The connection control unit 234 establishes a connection with the image forming apparatus 30. For example, the connection control unit 234 acquires information on the connection target device via the user interface displayed by the second display control unit 232. Then, the connection control unit 234 establishes the connection with a selected one of the image forming apparatuses 30 based on the information. In addition to establishing the communication, the connection control unit 234 performs login processing in relation to the image forming apparatus 30 selected by the user.

Figure 5:
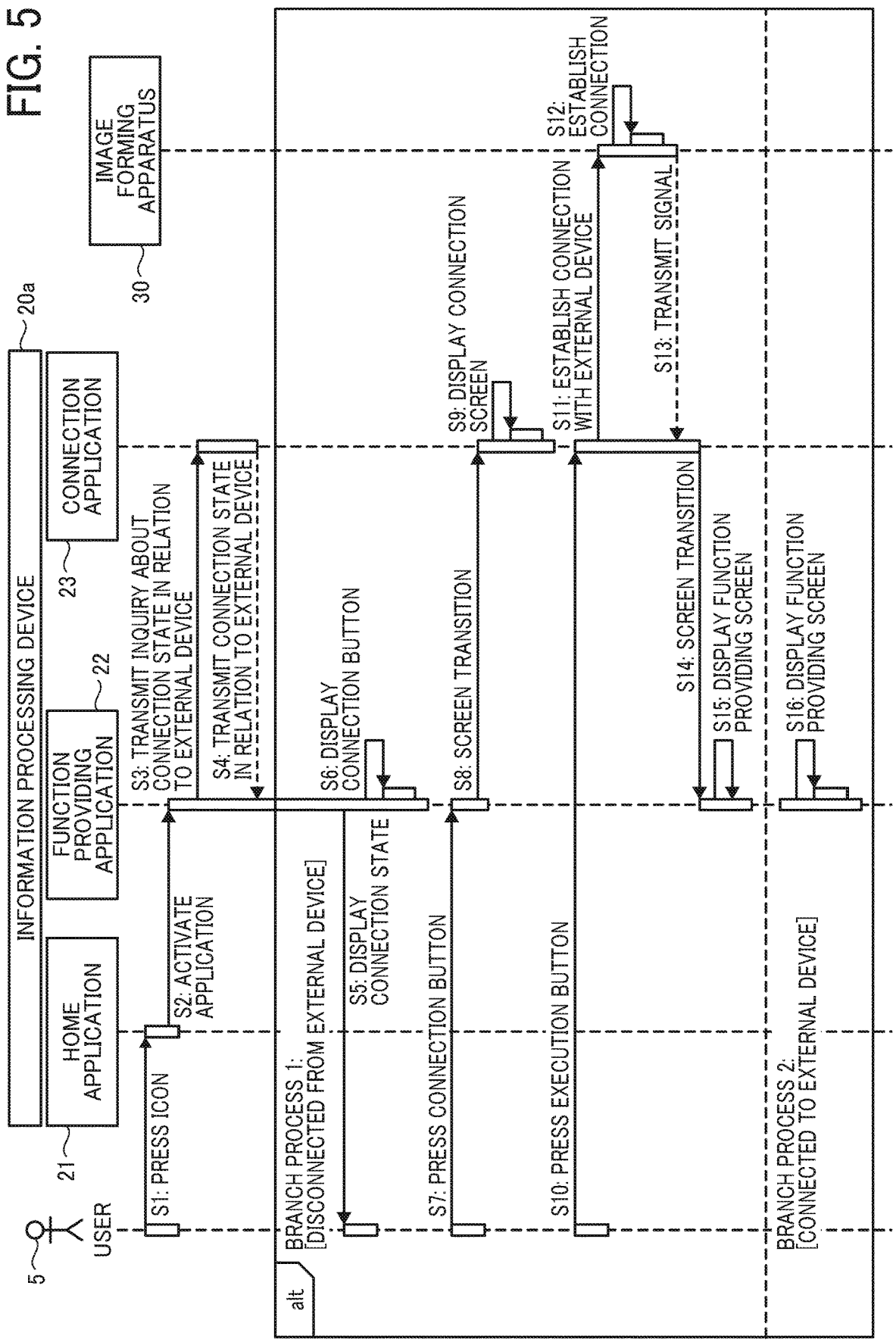
FIG. 5 is a sequence diagram illustrating an example of a processing flow of checking a connection, according to the first embodiment of the disclosure.

A description is now given of a processing flow performed by the information processing device 20*a* according to the present embodiment. FIG. 5 is a sequence diagram illustrating an example of a processing flow of checking a connection, according to the present embodiment. In the example of FIG. 5, the home application 21 displays a main screen on the control panel 705 in advance. When a user 5 performs an operation of selecting any one of the function providing applications 22 by pressing an icon of the main screen (S1), the home application 21 activates the function providing application 22 corresponding to the icon pressed by the user 5 (S2). For example, the home application 21 activates the function providing application 22 by transmitting an instruction signal for the activation to the function providing application 22. In addition, the user 5 may activate a desired one of the function providing applications 22 without going through the home application 21 or may activate a desired one of the function providing applications 22 from another one of the function providing applications 22.

After the function providing application 22 is activated in response to the instruction signal received from the home application 21, the first communication unit 221 of the function providing application 22 transmits, to the connection application 23, an inquiry about a connection state between the information processing device 20*a* and the image forming apparatus 30, which is an external device (S3). Hereinafter, the connection state between the information processing device 20*a* and the image forming apparatus 30 is also referred to as a connection state in relation to the image forming apparatus 30, when being viewed from a side of the information processing device 20*a*.

Upon receiving the inquiry from the function providing application 22, the second communication unit 231 of the connection application 23 transmits, to the function providing application 22, the connection state in relation to the image forming apparatus 30 (S4). More specifically, upon receiving the inquiry from the function providing application 22, the second communication unit 231 transmits, to the connection state determination unit 233, the inquiry about the connection state in relation to the image forming apparatus 30. In response to the inquiry, the connection state determination unit 233 determines whether the image forming apparatus 30 is connected or disconnected and transmits a determination result to the second communication unit 231. The second communication unit 231 transmits the connection state determined by the connection state determination unit 233 to the function providing application 22. The connection application 23 stores information indicating the connection state in relation to the image forming apparatus 30 in advance. For example, the connection application 23 can retain information indicating whether the information processing device 20a is connected to an external device or not, or information indicating which one or more of the external devices are currently connected to the information processing device 20a, by storing information used to establish a communication or information used to perform login processing in relation to the image forming apparatus 30 selected by the user. A detailed description of establishing a communication and performing the login processing performed by the connection application 23 is deferred.

In addition, the connection state determination unit 233 of the connection application 23 acquires information indicating whether each image forming apparatus 30 is connected or not based on the presence or absence of a communication signal between the information processing device 20 and each image forming apparatus 30. The connection state determination unit 233 of the connection application 23 may store the information indicating whether each image forming apparatus 30 is connected or not in the flash memory 704, for example. For example, the connection state determination unit 233 reads information indicating the presence or absence of the connection with each image forming apparatus 30 according to the inquiry transmitted from the function providing application 22. Alternatively, the connection state determination unit 233 may acquire the information indicating the presence or absence of the connection with each image forming apparatus 30 via the wireless network 300 upon receiving the inquiry transmitted from the function providing application 22.

When the function providing application 22 receives, from the connection application 23, a response indicating that the information processing device 20a is not connected to the image forming apparatus 30, namely the information processing device 20a is disconnected from the image forming apparatus 30, the process proceeds to a branch process 1.

In the branch process 1 illustrated in FIG. 5, the first display control unit 222 of the function providing application 22 displays, on the control panel 705, a message indicating the connection state (connected or disconnected) in relation to the image forming apparatus 30 (S5).

Subsequently, the first display control unit 222 of the function providing application 22 displays, on the control panel 705, a connection button for starting the process of connecting to the image forming apparatus 30 (S6). A screen 902, described later, including such a connection button is an example of a third screen that can receive an execution instruction to execute the connection processing to establish the communication connection. When the first display control unit 222 receives an operation of pressing the connection button performed by the user 5 (S7), the first communication unit 221 of the function providing application 22 transmits, to a connection application 23, an instruction to shift the current screen to a connection screen provided by the connection application 23 (S8). Hereinafter, the instruction is also referred to as an instruction for a screen transition.

Figure 6:
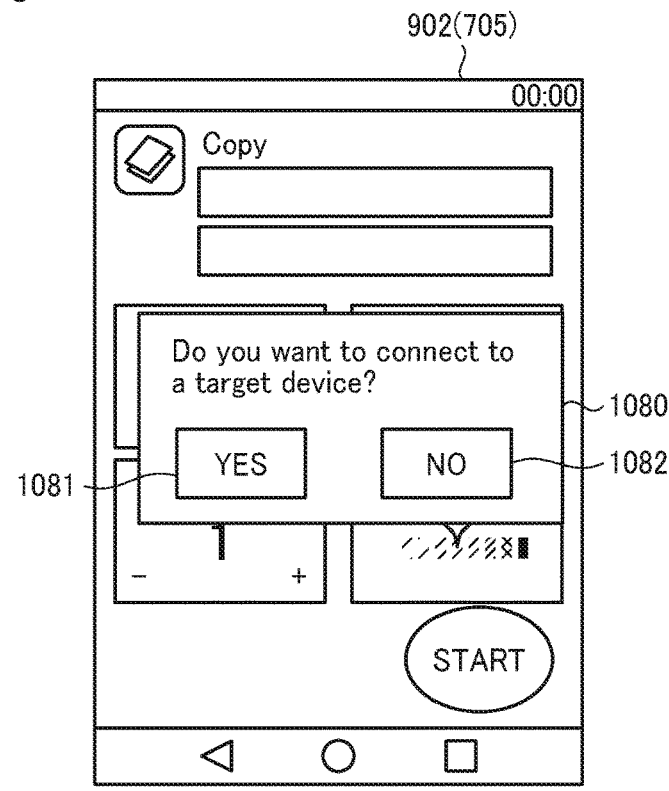
FIG. 6 is an illustration of a screen including a connection button according to the first embodiment of the disclosure.

FIG. 6 is an illustration of the screen 902 that includes a connection button 1080 according to the present embodiment. As illustrated in FIG. 6, the screen 902 displays the connection button 1080 overlapped on another screen for setting conditions on or for instructing copying, which is a function provided by the function providing application 22, to be executed by the communication target device (e.g. image forming apparatus 30). In addition, the connection button 1080 may be overlapped on a screen for displaying an execution result of the copying. In the example of FIG. 6, the connection button 1080 includes a YES button 1081 and a NO button 1082. When the YES button 1081 is pressed, the first display control unit 222 controls the display in a manner that the current screen is shifted to a connection screen provided by the connection application 23. When the NO button 1082 is pressed, the first display control unit 222 stops displaying the connection button 1080. In addition, the YES button 1081 may be referred to as a connection button. Note that the particular manner of displaying the screen 902 including the connection button 1080 is not limited to the example illustrated in FIG. 6, and the first display control unit 222 may display only a connection button corresponding to the YES button 1081.

In addition, when the activation of the function providing application 22 is instructed, the first display control unit 222 may cause the control panel 705 not to display the function providing screen provided by the function providing application 22, but to display the connection screen provided by the connection application 23. Alternatively, when the activation of the function providing application 22 is instructed, the first display control unit 222 may cause the control panel 705 to display the connection screen provided by the connection application 23 immediately after the function providing screen provided by the function providing application 22 is displayed. For example, when the connection with the external device (that is, the communication target device, for example, the image forming apparatus 30) is not established, the connection application 23 may display the connection screen in response to the inquiry about the connection state in relation to the external device received from the function providing application 22, or after transmitting the connection state to the function providing application 22 in response to the inquiry. Doing so can omit the processing of S5 to S7, resulting in improved convenience for the user.

In addition, the first display control unit 222 of the function providing application 22 may cause the control panel 705 to shift a current screen to the connection screen. In addition, the second display control unit 232 of the connection application 23 may display the connection button. In this case, when the connection button displayed by the connection application 23 is pressed, the second display control unit 232 of the connection application 23 may cause the control panel 705 to shift a current screen to the connection screen or may transmit an instruction for the screen transition to the function providing application 22.

Figure 7:
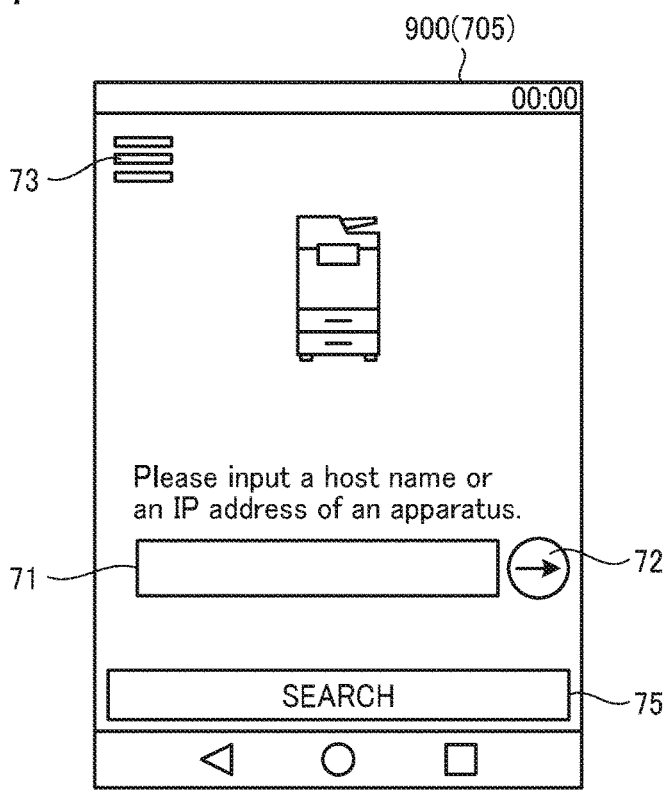
FIG. 7 is an illustration of a connection screen according to the first embodiment of the disclosure.

When the second communication unit 231 of the connection application 23 receives the instruction for the screen transition from the function providing application 22, the second display control unit 232 displays, on the control panel 705, the connection screen for receiving an input operation for connecting to the image forming apparatus 30 (S9). FIG. 7 is an illustration of a connection screen 900 according to the present embodiment. As illustrated in FIG. 7, the connection screen 900 includes an entry field 71 in which a host name or an internet protocol (IP) address for identifying the image forming apparatus 30 as a connection destination can be entered, and an execution button 72. In addition, as in the example of FIG. 7, the connection screen 900 may further include a menu button 73, and a search button 75 capable of searching for a device as the connection destination, for example. The connection screen 900 is an example of a first screen in the present embodiment. In the example of FIG. 7, the connection screen 900 allows the user 5 to input the image forming apparatus 30 as the connection destination. However, the present embodiment is not intended to be limited to this, and the second display control unit 232 of the connection application 23 may display, on the connection screen 900, one or more host names or one or more IP address of one or more of the image forming apparatuses 30 connectable to the information processing device 20a.

Subsequently, when the connection control unit 234 of the connection application 23 receives, via the control panel 705, a user operation in which the user 5 presses the execution button 72 after entering the host name or the IP address in the entry field 71 on the connection screen 900 (S10), the connection control unit 234 of the connection application 23 establishes a communication connection with the image forming apparatus 30 identified by the host name or the IP address entered in the entry field 71 (S11). The host name or the IP address entered in the entry field 71 is referred to as connection destination information. The pressing of the execution button 72 performed by the user 5 is an example of the input for connecting to the image forming apparatus 30 in the present embodiment.

Upon receiving processing of establishing a communication connection from the connection application 23, the image forming apparatus 30 establishes the connection with the information processing device 20a (S12). When the communication connection is established, the image forming apparatus 30 transmits a signal to the connection application 23 (S13). In addition, when being connected to the image forming apparatus 30, the connection application 23 stores information indicating which image forming apparatus 30 is currently connected, in a storage area to which the connection application 23 can refer. Examples of the storage area include the flash memory 704 and the RAM 703.

Subsequently, when being connected to the image forming apparatus 30, the second communication unit 231 of the connection application 23 transmits a notification of a connection completion to the function providing application 22, which is the transmission source of the instruction for a screen transition in S8. In addition, the second display control unit 232 of the connection application 23 instructs the function providing application 22 to shift the current screen to the function providing screen that provides the function of the function providing application 22 (S14). Alternatively, the second display control unit 232 of the connection application 23 may cause the control panel 705 to shift the current screen to the function providing screen.

Subsequently, upon receiving the instruction for a screen transition from the connection application 23 after the connection application 23 establishes the connection with the image forming apparatus 30, the first display control unit 222 of the function providing application 22 displays, on the control panel 705, the function providing screen for providing the function of the function providing application 22 (S15). The function providing screen varies depending on the function corresponding to the function providing application 22. For example, when the function providing application 22 is the print application 1221, a screen for selecting a file such as a photo or a document to be printed, a screen for setting printing conditions, a screen for executing printing, or a screen for receiving an operation required for executing a job is displayed, for example. In addition, the function providing screen is also referred to as an execution screen with which the function providing application 22 executes the corresponding processing. The function providing screen is an example of a second screen in the present embodiment. The function unit 223 instructs the execution unit of the image forming apparatus 30 to execute predetermined processing such as printing based on an operation input made by the user 5 on the function providing screen.

In the present embodiment described above, the example in which the first screen, which is a full screen, transitions to the second screen, which is another full screen is described. However, the embodiments of the disclosure are not limited to this, and the first screen or the second screen may not always have to be a full screen. For example, in some embodiments, the first screen and the second screen may be displayed at the same time, namely displayed in different sections on a screen. As one example, the first screen and the second screen may be displayed to be in parallel with each other. In some other embodiments, one of the first screen and the second screen may be a pop-up window and displayed at the same time with the other one of the first screen and the second screen. In some other embodiments, both of the first screen and the second screen may be pop-up windows to be displayed together.

Figure 8:
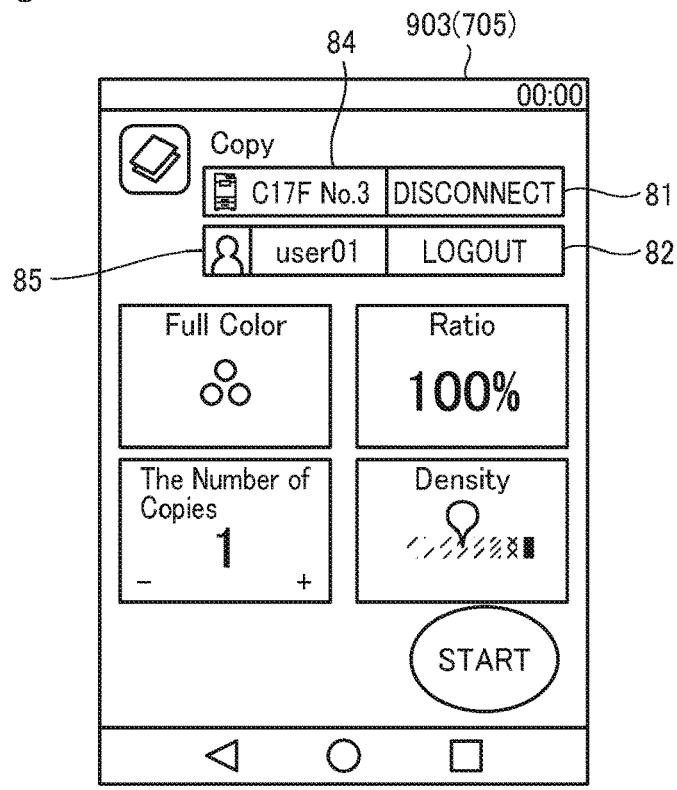
FIG. 8 is an illustration of a function providing screen according to the first embodiment of the disclosure.

FIG. 8 is an illustration of a function providing screen 903 according to the present embodiment. The function providing screen 903 is a screen for, for example, setting conditions and instructing an execution concerning, for example, a copy function, which is to be executed by the communication target device as a function provided by the function providing application 22. In addition, the function providing screen 903 may be a screen for displaying an execution result, for example. In addition, the function providing screen 903 may display information on the image forming apparatus 30 with which a connection has been established or information on a user who is currently logged in to the image forming apparatus 30. In the example of FIG. 8, the function providing screen 903 includes an image forming apparatus name displaying area 84 and a user displaying area 85. The image forming apparatus name displaying area 84 displays a name of the image forming apparatus 30 that is currently connected to the information processing device 20a or to which the user is currently logged in, and the user displaying area 85 displays a user name or a user ID for identifying the user who is currently logged in. In addition, as illustrated in FIG. 8, the first display control unit 222 may display, on the function providing screen 903, a disconnect button 81, which is for disconnecting from the image forming apparatus 30 when the user presses it, and a logout button 82, which is for logging out of the user when the user presses it. However, the function providing screen 903 does not need to include the disconnect button 81 and the logout button 82.

In the processing of S4 illustrated in FIG. 5, when the second communication unit 231 of the connection application 23 transmits, to the first communication unit 221 of the function providing application 22, the information indicating that the information processing device 20a is connected to the image forming apparatus 30, the function providing application 22 performs a branch process 2.

In the branch process 2, because the connection between the information processing device 20a and the image forming apparatus 30 has been established, the first display control unit 222 of the function providing application 22 displays, on the control panel 705, the function providing screen 903 provided by the function providing application 22 (S16). In addition, before displaying the function providing screen 903, the first display control unit 222 may display a message indicating the connection state (connected or disconnected) in relation to the image forming apparatus 30.

As described above, the information processing device 20a according to the present embodiment displays the connection screen 900 on the control panel 705 when an instruction to activate the function providing application 22 is received and when the communication connection with the image forming apparatus 30 is not established. In addition, the information processing device 20a according to the present embodiment displays the function providing screen 903 on the control panel 705 after the connection application 23 establishes the connection with the image forming apparatus 30. Therefore, according to the information processing device 20a according to the present embodiment, the burden on of the user 5 due to checking the connection state between the information processing device 20a and the image forming apparatus 30 can be reduced.

More specifically, the information processing device 20a according to the present embodiment displays the connection screen 900 according to the connection state between the information processing device 20a and the image forming apparatus 30, even when the user 5 operates for activating the function providing application 22 without checking whether the information processing device 20a is connected to the image forming apparatus 30 or not. Therefore, the user 5 can start using the function providing application 22 without checking the connection state before operating a corresponding icon for activating the function providing application 22. As a result, the user 5 can perform an operation for activating a desired one of the function providing applications 22 regardless of the connection state between the information processing device 20a and the image forming apparatus 30, resulting in a reduction of checking or other operations that can bother the user 5.

In addition, according to the information processing device 20a of the present embodiment, the function providing application 22 transmits, to the connection application 23, an inquiry about the connection state between the information processing device 20a and the image forming apparatus 30. When receiving the activation instruction in a case in which the communication connection with the image forming apparatus 30 is not established, the function providing application 22 causes the control panel 705 to display the screen 902 including a connection button. In addition, when an operation for establishing the communication connection is received on the screen 902 including a connection button, the connection application 23 causes the control panel 705 to display the connection screen 900. Accordingly, the information processing device 20a according to the present embodiment that displays the screen 902 including a connection button according to the connection state allows the user 5 to operate for connecting to a desired one of the image forming apparatuses 30 smoothly. Doing so streamlines operation.

In addition, the information processing device 20a according to the present embodiment includes the function providing application 22 and the connection application 23 that are pieces of software (application software) independent of each other, and the connection application 23 can efficiently execute the processing of concerning to the image forming apparatus 30 even when there are a number of function providing applications 22 each of which is for a different purpose. In addition, the processing of connecting to the image forming apparatus 30 may vary depending on the information processing device 20a. As in the present embodiment, by configuring the function providing application 22 and the connection application 23 as different software (application software), the function providing application 22 can be shared with the information processing devices 20 each of which has a connection specification that is different from that of another one of the information processing devices 20. This allows the designer of the function providing application 22 to produce the function providing application 22 more easily.

Furthermore, in the information processing device 20a according to the present embodiment, the function providing application 22 transmits, to the connection application 23, an inquiry about the connection state between the information processing device 20a and the image forming apparatus 30 upon the activation of the function providing application 22. Therefore, according to the information processing device 20a according to the present embodiment, when the user 5 performs an operation for activating a desired one of the function providing applications 22, the user 5 is led to the screen 902 including a connection button or the connection screen 900 due to the screen transition, as necessary, resulting in reduction of operations that can bother the user.

First Modification

In the first embodiment described above, immediately after the connection application 23 establishes the connection with the image forming apparatus 30, the screen transitions to the function providing screen 903. However, the present disclosure is not intended to limit to this, and a login screen for logging in to the image forming apparatus 30 may be displayed on the control panel 705 before the function providing screen 903.

Figure 9:
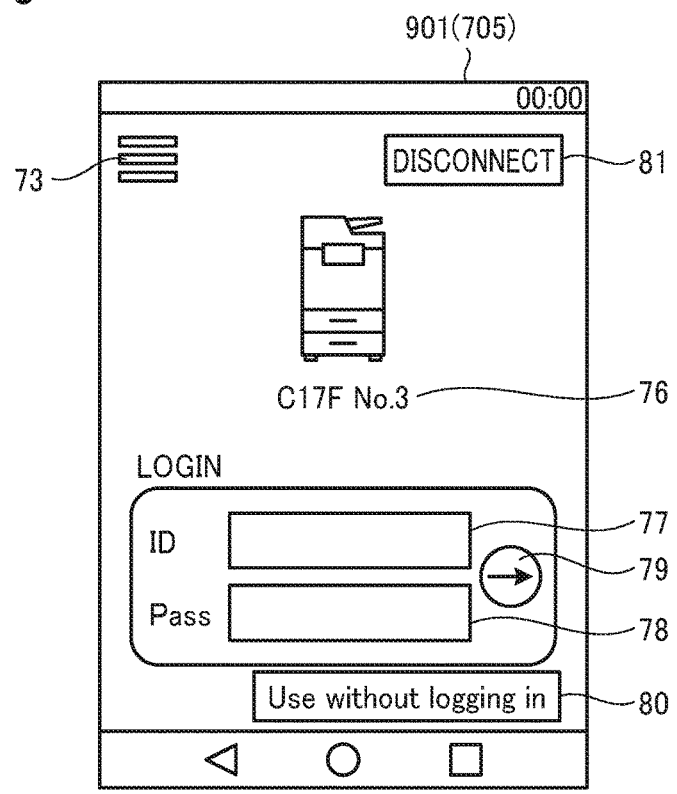
FIG. 9 is an illustration of a login screen according to a modification of the first embodiment of the disclosure.

FIG. 9 is an illustration of a login screen 901 according to a first modification. The login screen 901 is also referred to as an authentication screen, and includes, for example, a user ID input field 77, a password input field 78, and an execution button 79 for executing logging in. The connection control unit 234 of the connection application 23 transmits, to the image forming apparatus 30, a user ID and a password input, in addition to an authentication request and performs login processing to log in to the image forming apparatus 30.

In addition, the login screen 901 may include a menu button 73, a disconnect button 81 for disconnecting from the image forming apparatus 30, a displaying area 76 for displaying a device name of the image forming apparatus 30, which is currently connected, a "use without logging in" button 80, as illustrated in FIG. 9. When the "use without logging in" button 80 is pressed, the connection control unit 234 of the connection application 23 keeps the connection with the image forming apparatus 30 without executing login processing of logging in to the image forming apparatus 30. In this case, the function unit 223 of the function providing application 22 can use a function that does not require user authentication among all the functions of the image forming apparatus 30. In addition, the connection application 23 may include a personal information management unit separately from the connection control unit 234. With this configuration, the personal information management unit may execute the login processing. In addition, the information processing device 20a may include a personal information management unit as software (application software) that is separated from the connection application 23.

Second Embodiment

In the first embodiment described above, the function providing application 22 transmits, to the connection application 23, an inquiry about the connection state in relation to the image forming apparatus 30 when being activated. In a second embodiment, the function providing application 22 transmits, to the connection application 23, an inquiry about the connection state in relation to the image forming apparatus 30 when performing processing to execute, or use, a function of the image forming apparatus 30, instead of immediately after being activated.

The overall configuration of the information processing system 100a and the configuration of the information processing device 20a according to the present embodiment are substantially the same as those of the first embodiment described above with reference to FIG. 1 to FIG. 4.

Figure 10B:
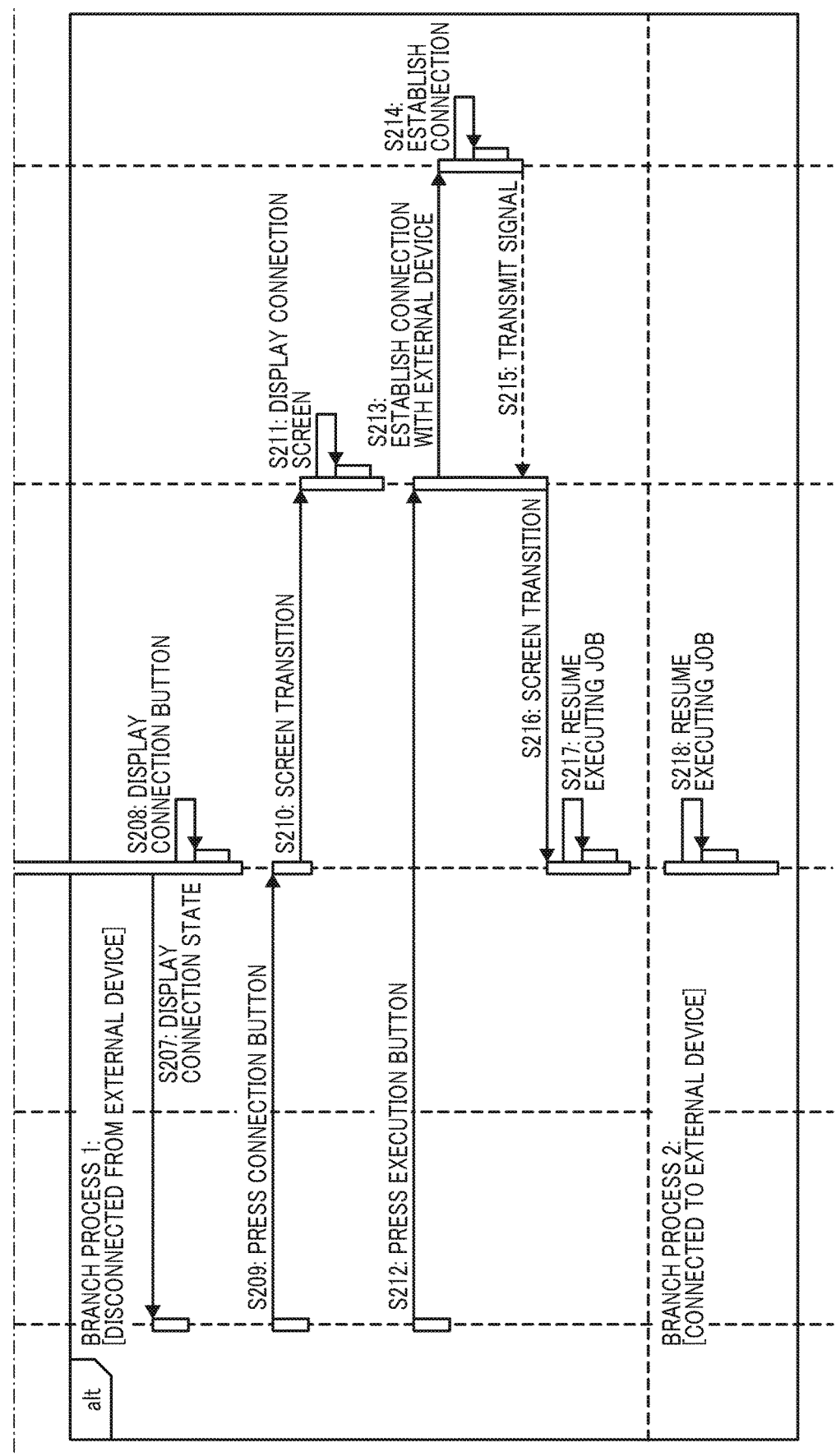

FIG. 10A and FIG. 10B (FIG. 10) are a sequence diagram illustrating an example of a processing flow of checking a connection, according to the present embodiment. Processing of S201, in which an operation in relation to an icon is performed by the user 5, and processing of S202, in which the function providing application 22 is activated are substantially the same as the processing of S1 and the processing of S2, respectively, described above with reference to FIG. 5.

The first display control unit 222 of the function providing application 22 according to the present embodiment displays the function providing screen 903 on the control panel 705, after the function providing application 22 is activated in response to an instruction signal transmitted from the home application 21 (S203). For example, when the function providing application 22, which is activated, is the print application 1221, a screen for viewing or selecting a file such as a photo or a document to be printed is displayed. At this point in time, the first display control unit 222 displays a photo or a document, which is stored in the flash memory 704 of the information processing device 20a and does not execute (use) a function of the image forming apparatus 30.

Subsequently, when receiving an operation of the user 5 instructing to execute a job (processing) using a function of the image forming apparatus 30 by, for example, a touch operation on the control panel 705 (S204), the first communication unit 221 of the function providing application 22 transmits, to the connection application 23, an inquiry about the connection state in relation to the image forming apparatus 30 (S205). For example, the user 5 touches a photo to be printed, displayed on the control panel 705, to execute printing of the photo. Because the printing requires using the printing function of the image forming apparatus 30, the first communication unit 221 transmits, to the second communication unit 231 of the connection application 23, an inquiry about the connection state in relation to the image forming apparatus 30.

In response to the inquiry from the first communication unit 221 of the function providing application 22, the second communication unit 231 of the connection application 23 transmits the connection state in relation to the image forming apparatus 30 to the function providing application 22 (S206).

When the function providing application 22 receives, from the connection application 23, a response indicating that the information processing device 20a is not connected to the image forming apparatus 30, the process proceeds to a branch process 1.

In the branch process 1 illustrated in FIG. 10B, processing from S207 to S216, which is from displaying the connection state to transitioning to the function providing screen 903, is substantially the same as the processing from S5 to S14 described above with reference to in FIG. 5.

After the connection application 23 establishes the connection with the image forming apparatus 30, the first display control unit 222 of the function providing application 22 displays the function providing screen 903 again. In addition, the function unit 223 resumes the job instructed to be executed from the user 5 in S204 (S217).

In the processing of 206, when the second communication unit 231 of the connection application 23 transmits, to the first communication unit 221 of the function providing application 22, information indicating that the information processing device 20a is connected to the image forming apparatus 30, the function providing application 22 performs a branch process 2.

In the branch process 2 illustrated in FIG. 10B, because the connection between the information processing device 20a and the image forming apparatus 30 has been established, the first display control unit 222 of the function providing application 22 continuously displays the function providing screen 903. In addition, the function unit 223 executes the job instructed, in S204, from the user 5 (S218).

As described above, in the information processing device 20a according to the present embodiment, the function providing application 22 transmits, to the connection application 23, the inquiry about the connection state in relation to the image forming apparatus 30 when performing processing to execute (use) a function of the image forming apparatus 30. Accordingly, the information processing device 20a according to the present embodiment displays the connection screen 900, as necessary, whenever the user 5 uses the function of the image forming apparatus 30, resulting in a reduction of unnecessary screen transition and inquiry processing.

For example, even when the user 5 activates the function providing application 22, the user 5 does not necessarily use a function of the image forming apparatus 30 immediately after the activation of the function providing application 22. For example, when one of the functions of the function providing application 22 is a function of viewing or editing an image stored in the information processing device 20a, the information processing device 20a does not have to be connected to the image forming apparatus 30. For example, when the user 5 desires to execute processing (a job) of sending a checked image, using the function of the image forming apparatus 30 such as the facsimile communication function after activating the function providing application 22, the function providing application 22 transmits, to the connection application 23, an inquiry about the connection state in relation to the image forming apparatus 30 whenever the job is executed. That is, according to the information processing device 20a according to the present embodiment, the function providing application 22 does not transmit the inquiry about the connection state when the user 5 does not desire to use a function of the image forming apparatus 30, resulting in reduction of the processing load.

Furthermore, a time to transmit, to the connection application 23, an inquiry about the connection state in relation to the image forming apparatus 30 may vary for each function providing application 22 by combining the configuration of the first embodiment and the configuration of the second embodiment. For example, the function providing application 22 including processing (a job) executable without using a function of the image forming apparatus 30 transmits the inquiry about the connection state at the time described in the second embodiment, and the other function providing applications 22 transmit the inquiry about the connection state at the time of the activation as described in the first embodiment. For example, the function providing application 22 may determine when to transmit the inquiry about the connection state by referring to setting information or function information set for the corresponding application in advance. In addition, the home application 21 may determine when to transmit the inquiry about the connection state by reading the setting information or the function information set for the function providing application 22 to be activated, and transmit, to the connection application 23, the inquiry about the connection state in relation to the external device instead of the function providing application 22.

Third Embodiment

In the first embodiment and the second embodiment described above, the connection application 23 checks whether the information processing device 20a is connected to the image forming apparatus 30 or not. In a third embodiment, the connection application 23 further checks whether the image forming apparatus 30 currently connected to the information processing device 20a has a function required by the function providing application 22.

The overall configuration of the information processing system 100a and the configuration of the information processing device 20a according to the present embodiment are substantially the same as those of the first embodiment described above with reference to FIG. 1 to FIG. 4.

FIG. 11A and FIG. 11B (FIG. 11) are a sequence diagram illustrating an example of a processing flow of checking a connection, according to the present embodiment. Processing of S301, in which an operation in relation to an icon is performed by the user 5, and processing of S302, in which the function providing application 22 is activated are substantially the same as the processing of S1 and the processing of S2, respectively, described above with reference to FIG. 5. In addition, processing of S303, in which the function providing screen 903 is displayed, and processing of S304, in which an operation of instructing to execute a job is received, are substantially the same as the processing of S203 and the processing of S204, respectively, described above with reference to FIG. 10A.

When receiving an operation of the user 5 instructing to execute a job (processing) to execute (use) a function of the image forming apparatus 30 by, for example, a touch operation on the control panel 705 (S304), the first communication unit 221 of the function providing application 22 transmits, to the second communication unit 231 of the connection application 23, an inquiry about the connection state in relation to the image forming apparatus 30 (S305). When transmitting, to the connection application 23, the inquiry about the connection state, the first communication unit 221 according to the present embodiment notifies the connection application 23 of capability conditions requested in the instruction of executing the job input in S304 from the user 5.

Figures 12, 13:
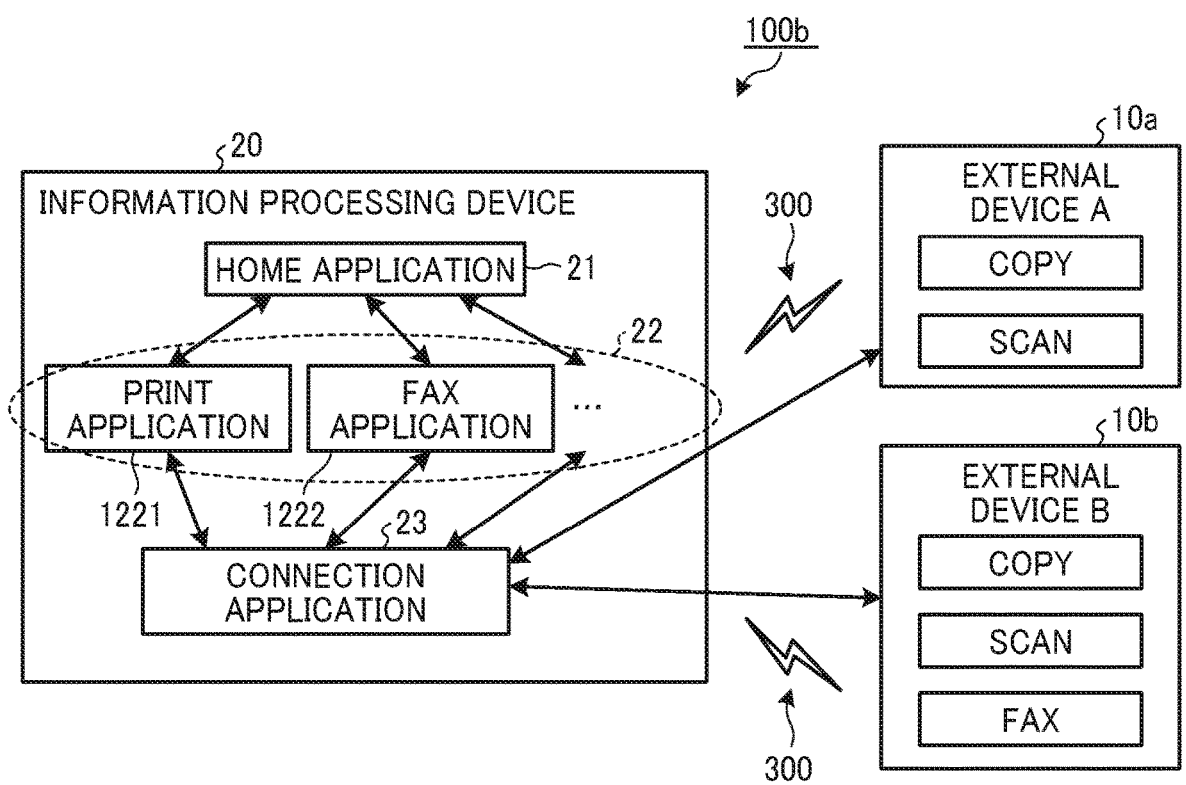
FIG. 12 is a conceptual diagram illustrating an example of a capability information table according to the third embodiment of the disclosure.
FIG. 13 is a block diagram illustrating an example of an overall configuration of an information processing system according to a fourth embodiment of the disclosure.

The capability conditions are information indicating a function of the image forming apparatus 30 or a type of sheet of paper, etc., required to execute the job included in the function providing application 22. FIG. 12 is a conceptual diagram illustrating an example of a capability information table 800 according to the present embodiment. As illustrated in FIG. 12, the capability information table 800 stores a record that includes a job name for identifying a job, a function to be used, and a type of sheet, in association with each other. The function to be used and the type of sheet are an example of the capability conditions on each job. The capability information table 800 is stored in the flash memory 704 in advance, for example.

The function to be used is a function of the image forming apparatus 30 used when the job included in the function providing application 22 is executed and is a function such as scanning (scan), facsimile communication (fax), printing (print), or copying, for example. In addition, the type of sheet is a size of a sheet of paper used to execute the job included in the function providing application 22. In addition, the type of sheet may indicate a type of paper such as coated paper, plain paper, or the like.

The first communication unit 221 of the function providing application 22 acquires, from the capability information table 800, a function to be used or a type of sheet associated with the job to be executed as the capability conditions on the job and transmits the capability conditions to the connection application 23. One example of the capability conditions in the present embodiment is information on a function to be used for identifying the function of the image forming apparatus 30 executed (used) by the function unit 223. In addition, another one example of the capability conditions in the present embodiment is information on a type of sheet for identifying a type of paper or a size of sheet used in the processing performed by the function unit 223.

The capability information does not have to be stored in a table format. For example, the capability conditions for each job included in the function providing application 22 may be tag information included in a program describing the function providing application 22. In addition, the function to be used and the type of sheet are not limited to the above examples. Further, the capability information may further include other conditions.

Then, when receiving, from the function providing application 22, the inquiry about the connection state in relation to the image forming apparatus 30 and a notification of the capability conditions required to execute the job, the connection control unit 234 of the connection application 23 checks capabilities of the image forming apparatus 30 that is currently connected to the information processing device 20a, namely the functions of the image forming apparatus 30 and the types of sheet supported by the image forming apparatus 30 (S306).

In the present embodiment, the functions of the image forming apparatus 30 currently connected to the information processing device 20a and the type of sheet supported by the image forming apparatus 30 currently connected to the information processing device 20a are stored in the flash memory 704 in association with identification information identifying the corresponding image forming apparatus 30, for example. The connection control unit 234 of the connection application 23 acquires information indicating the functions of the image forming apparatus 30 from the image forming apparatus 30 and stores the acquired information in the flash memory 704 upon connecting to the image forming apparatus 30. In addition, the connection application 23 may store, in the flash memory 704, information on the functions of the image forming apparatus 30 that is previously connected to the information processing device 20a, in addition to the information on the functions of the image forming apparatus 30 currently connected to the information processing device 20a. Alternatively, the functions of the image forming apparatus 30 may be reported by the image forming apparatus 30 to the connection application 23.

The connection control unit 234 compares the capability conditions reported by the function providing application 22 with the capabilities of the image forming apparatus 30 that is currently connected to the information processing device 20a. This processing may be performed by the connection state determination unit 233. The second communication unit 231 of the connection application 23 transmits, to the function providing application 22, information on the image forming apparatus 30 that satisfies the capability conditions reported by the function providing application 22 and information indicating whether the information processing device 20a is connected to the image forming apparatus 30 that satisfies the capability conditions or not (S307). At this time, the connection control unit 234 may search for one or more of the image forming apparatuses 30 connectable to the information processing device 20a. In this case, the second communication unit 231 transmits information identifying one or more the image forming apparatuses 30 that satisfy the capability conditions reported by the function providing application 22 among all of the image forming apparatuses 30 connectable to the function providing application 22. The information identifying the image forming apparatus 30 is a host name or an IP address, for example.

Based on the connection state in relation to the image forming apparatus 30 acquired from the connection application 23, the function unit 223 of the function providing application 22 determines whether the information processing device 20a is connected to the image forming apparatus 30 that satisfies the capability conditions on the processing (job) executed by the function providing application 22 or not. This determination may be performed by the first communication unit 221.

When the information processing device 20a is not connected to any of the image forming apparatuses 30 or when the information processing device 20a is connected to the image forming apparatus 30 that does not satisfy the capability conditions, the process of the function providing application 22 proceeds to a branch process 1. In addition, the connection control unit 234 or the connection state determination unit 233 of the connection application 23 can determine whether the information processing device 20a is currently connected to the image forming apparatus 30 that satisfies the capability conditions on the job or not, based on the capability conditions received from the function providing application 22 and the capability conditions acquired from the image forming apparatus 30, which is currently connected, and transmits a determination result to the function providing application 22.

In the branch process 1 illustrated in FIG. 11B, the processing from S308 to S310, which is from displaying the connection state to receiving an operation of pressing the connection button is substantially the same as the processing from S5 to S7 described above with reference to FIG. 5.

When an operation of pressing the connection button performed by the user 5 is received (S310), the first communication unit 221 of the function providing application 22 instructs the second communication unit 231 of the connection application 23 to shift a current screen to the connection screen 900 and notifies the capability conditions required to execute the job (S311). This instruction is also referred to as an instruction for a screen transition.

When the second display control unit 232 of the connection application 23 receives the screen transition instruction from the function providing application 22, the second display control unit 232 displays the connection screen 900 on the control panel 705 (S312). At this time, the second display control unit 232 displays, on the connection screen 900, the host name or the IP address identifying the image forming apparatus 30 that satisfies the capability conditions reported by the function providing application 22.

More specifically, the connection control unit 234 searches for one or more of the image forming apparatuses 30 that are connectable to the information processing device 20a, and acquires information indicating the capabilities of each of the connectable image forming apparatuses 30. The connection control unit 234 may search the flash memory 704 for information, which is acquired in advance, indicating the capabilities of each of the image forming apparatuses 30. Then, the connection control unit 234 identifies the image forming apparatus 30 that satisfies the capability conditions reported by the function providing application 22, among the plurality of image forming apparatuses 30 connectable to the information processing device 20a. The second display control unit 232 displays, on the connection screen 900, the image forming apparatus 30 identified by the connection control unit 234. When there is more than one image forming apparatus 30 that satisfies the capability conditions, the connection control unit 234 identifies any one of the more than one image forming apparatuses 30 to establish a communication connection. Alternatively, the connection control unit 234 may be connected to the more than one image forming apparatuses 30, which satisfy the capability conditions. Instead of the connection control unit 234, the connection state determination unit 233 may identify the image forming apparatus 30 that satisfies the capability conditions.

When the connection control unit 234 of the connection application 23 receives an operation of pressing the execution button 72 performed by the user 5 on the control panel 705 (S313), the connection control unit 234 of the connection application 23 establishes a communication connection with the image forming apparatus 30 identified in S312, which satisfies the capability conditions reported by the function providing application 22 (S314).

Processing of S315 to S317, which is from establishing a connection performed by the image forming apparatus 30 to the screen transition to the function providing screen 903, is substantially the same as the processing of S12 to S14 described above with reference to FIG. 5. In addition, processing of S315, in which executing the job is resumed, is substantially the same as the processing of S217 described above with reference to FIG. 10B.

In addition, when determining that the image forming apparatus 30, which satisfies the capability conditions on the processing (job) to be executed by the function providing application 22, is connected, based on the connection state in relation to the image forming apparatus 30 transmitted by the connection application 23 in S307, the process performed by the function providing application 22 proceeds to a branch process 2. The branch process 2 illustrated in FIG. 11B is substantially the same as the processing of S218 described above with reference to FIG. 10B.

In the processing of S312 in which the connection screen 900 is displayed, the connection application 23 may receive an input of host name or IP address from the user 5, in the same manner as on the connection screen 900 according to the first embodiment described above with reference to FIG. 7. The connection application 23 may identify the image forming apparatus 30 that satisfies the capability conditions reported by the function providing application 22 among the plurality of connectable image forming apparatuses 30 and establishes a communication connection with the identified image forming apparatus 30 without displaying the connection screen 900.

As described above, in the information processing device 20a according to the present embodiment, the connection application 23 establishes the communicates connection with the image forming apparatus 30 that satisfies the capability conditions on the job to be executed by the function providing application 22. Accordingly, the information processing device 20a according to the present embodiment connects to the image forming apparatus 30 capable of executing the job, which is desired by the user 5 and which is to be executed by the function providing application 22. This suppress an error that may occur when the information processing device 20a is connected to the image forming apparatus 30 that does not satisfy the capability conditions executes the job. In addition, doing so also streamlines reconnection.

As in the second embodiment, the function providing application 22 according to the present embodiment transmits, to the connection application 23, the inquiry about the connection state whenever a job to use a function of the image forming apparatus 30 is executed. However, the present embodiment of the disclosure is not limited to this, and for example, as in the first embodiment, the function providing application 22 may transmit, to the connection application 23, the inquiry about the connection state whenever the function providing application 22 is activated. In addition, the function providing application 22 may transmit, to the connection application 23, the capability conditions on all the jobs included in the function providing application 22 in addition to the inquiry about the connection state when being activated. Furthermore, the first modification may be combined with one of the second embodiment and the third embodiment.

Fourth Embodiment

FIG. 13 is a block diagram illustrating an example of an overall configuration of an information processing system 100b according to a fourth embodiment. As illustrated in FIG. 13, the information processing system 100b includes an external device A 10a and an external device B 10b (hereinafter, individually or collectively referred to as an external device 10 or external devices 10 unless otherwise distinguished) and an information processing device 20.

The external device 10 is, for example, an MFP, an interactive whiteboard (IWB), which is an electronic blackboard, or the like. Each external device 10 has functions such as a copying function (copy), a scanning function (scan), a facsimile communication function (fax), and a printing function (print), for example. Hereinafter, hardware, such as a plotter and a scanner, and software that execute various kinds of processing of copying, scanning, facsimile communication, and printing are collectively referred to as an execution unit for executing each kind of processing. The external device 10 receives, from the information processing device 20, an execution instruction to execute processing via a wireless network 300, and the execution unit executes processing based on the received execution instruction. The functions of each external device 10 are not limited to the above-described functions, and the functions of one of the external devices 10 may be different from those of the other one of the external devices 10. The external device 10 is an example of a communication target device in the present embodiment. In the present embodiment, the external device 10 has the same functions as the image forming apparatus 30 according to the first embodiment.

The information processing device 20 has the same function as the information processing device 20a according to the first embodiment. Examples of the information processing device 20 include an information processing terminal such as a tablet terminal and a smartphone (smart terminal, smart device). However, the information processing device 20 is not limited to these and may be a control panel connected to an image forming apparatus using a wired connection. The information processing device 20 includes a home application (home application software) 21, a function providing application (function providing application software) 22, and a connection application (connection application software) 23. The home application 21 and the connection application 23 may be separated from each other or may be combined with each other as one application.

The home application 21 displays a main screen (initial screen) on a display of the information processing device 20. On the main screen, icons used by a user to designate a desired operation are arranged. When an icon on the main screen is operated, the home application 21 activates the function providing application 22 corresponding to the icon. In addition, when the information processing device 20 is a computer in a multitask environment, the information processing device 20 can maintain a plurality of applications in activated states. The home application 21 may move, to the foreground, the function providing application 22 associated with the icon operated by the user among all the function providing applications 22 that have been activated and running in the background. Hereinafter, making the function providing application 22 enter an available state by activating the function providing application 22 or moving the function providing application 22 to the foreground may also be expressed as executing the function providing application 22.

The function providing application 22 performs various kinds of processing to use, or execute, a function of the external device 10 and provides the function to the user. In the example illustrated in FIG. 13, the function providing application 22 includes a print application 1221 and a facsimile communication (fax) application 1222. The print application 1221 is software (application software) that uses the printing function of the external device 10. The fax application 1222 is software (application software) that uses the facsimile communication function of the external device 10. The function providing application 22 is also referred to as a function providing unit.

The connection application 23 establishes a communication connection with the external device 10. For example, the information processing device 20 and the external device 10 can communicate with each other via the wireless network 300. The connection application 23 establishes a connection with the external device 10 via the wireless network 300 and performs processing for logging in to the external device 10 according to a user operation, for example. In addition, the connection application 23 stores information on a connection state (the presence or absence of connection) in relation to each external device 10. In response to an inquiry about the connection state between the information processing device 20 and each external device 10, received from the function providing application 22, the connection application 23 transmits, to the function providing application 22, the connection state in relation to each of the external devices 10. The connection application 23 is also referred to as a connection unit. In addition, a means of establishing the connection between the information processing device 20 and the external device 10 is not limited to a wireless communication, and the information processing device 20 and the external device 10 may be connected to each other by a wired communication such as a USB cable.

The function providing application 22 and the connection application 23 executed by the information processing devices 20, the information processing device 20a, or the fixed control device 20b, according to the first to fourth embodiments, are provided as files in a installable format or in a executable format, using such as a CD-ROM, a flexible disk (FD), a CD-Recordable (CD-R), a DVD (Digital Versatile Disk), or the like.

In addition, the function providing application 22 and the connection application 23 executed by the information processing devices 20, the information processing device 20a, or the fixed control device 20b, according to the first to fourth embodiments, may be provided by being stored in a computer connected to a network such as the Internet and downloaded via the network. In addition, the function providing application 22 and the connection application 23 executed by the information processing devices 20, the information processing device 20a, or the fixed control device 20b, according to the first to third embodiments, may be provided or distributed via a network such as the Internet.

In addition, the function providing application 22 and the connection application 23 executed by the information processing devices 20, the information processing device 20a, or the fixed control device 20b, according to the first to fourth embodiments, may be provided by being implemented in a ROM in advance, for example. Regarding actual hardware of the function providing application 22 and the connection application 23 executed by the information processing devices 20, the information processing device 20a, or the fixed control device 20b, according to the first to third embodiments, a CPU (processor) reads out a program for each of the function providing application 22 and the connection application 23 from the computer-readable medium for execution to load the program onto a main memory to implement, on the main memory, each of the function providing application 22 (first communication unit, first display control unit, function unit) and the connection application 23 (second communication unit, second display control unit, connection state determination unit, connection control unit).

According to some of the embodiments described above, it is possible to reduce the work of checking a connection state between the information processing device and the communication target device.

Any one of the above-described operations may be performed in various other ways, for example, in an order different from the one described above. Moreover, each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Although embodiments of the disclosure have been described and illustrated above, such description is not intended to limit the disclosure to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An information processing device, comprising:
a memory that stores a first application and a second application; and
a processor configured to
activate the second application in response to an activation instruction to activate the second application;
execute the first application to,
display, on a display, a first screen for receiving an input for connecting the information processing device to a communication target device, in response to the activation instruction to activate the second application, while the information processing device is disconnected from the communication target device, and
establish a communication connection with the communication target device based on the input received on the first screen, and
execute the second application to display, on the display, a second screen for performing processing of the second application after the communication connection is established with the communication target device.

2. The information processing device of claim 1, wherein
the second application configures the processor to transmit, to the first application, an inquiry about a connection state between the information processing device and the communication target device at a predetermined time, and
the first application configures the processor to transmit the connection state to the second application in response to the inquiry,
wherein the second application configures the processor to display the first screen based on the connection state indicating that the information processing device is disconnected from the communication target device.

3. The information processing device of claim 2, wherein
the second application configures the processor to display, on the display, a third screen for receiving an instruction to execute processing to connect to the communication target device, in response to the activation instruction to activate the second application, while the information processing device is disconnected from the communication target device, and
the first application configures the processor to display, on the display, the first screen in response to the instruction to execute processing to connect to the communication target device, received on the third screen.

4. The information processing device of claim 3,
wherein the second application configures the processor to display the third screen based on the connection state indicating that the information processing device is disconnected from the communication target device.

5. The information processing device of claim 2,
wherein the predetermined time is a time when the second application is activated.

6. The information processing device of claim 1, wherein
the second application configures the processor to perform processing to provide one or more functions of the communication target device,
the predetermined time is a time when the second application configures the processor to perform processing to use at least one function of the one or more functions of the communication target device, and
the second screen is for performing processing to provide the at least one function of the one or more functions of the communication target device.

7. The information processing device of claim 6, wherein
the second application configures the processor to further transmit, to the first application, information identifying the at least one function to be used, and
the first application configures the processor to
identify the communication target device that supports the at least one function identified based on the information identifying the at least one function to be used, and
establish the communication connection with the communication target device identified based on the information identifying the at least one function to be used.

8. The information processing device of claim 6, wherein,
the second application configures the processor to further transmit, to the first application, one of first information and second information, the first information indicating a paper type being to be used in the processing performed by the second application and the second information indicating a sheet size being to be used in the processing performed by the second application, and
the first application configures the processor to
identify the communication target device that supports one of the paper type and the sheet size identified by a corresponding one of the first information and the second information received, and
establish the communication connection with the at least one communication target device identified based on the one of the first information and the second information.

9. The information processing device of claim 1, wherein,
the first application configures the processor to display, on the display, the first screen at a set amount of time after the activation instruction is received by the information processing device, and
the second application configures the processor to display, on the display, the second screen after the communication connection is established with the communication target device.

10. An information processing system, comprising:
the information processing device of claim 1; and
a communication target device configured to execute a function according to an instruction received from the information processing device.

11. The information processing system of claim 10,
wherein the communication target device is an image forming apparatus configured to execute image forming.

12. An information processing method, comprising:
storing, in a memory, a first application and a second application;
activating the second application in response to an activation instruction to activate the second application;
displaying, on a display, a first screen for receiving an input for connecting the information processing device to a communication target device in response to the activation instruction;
establishing a communication connection between the information processing device and the communication target device based on the input received on the first screen, based on a determination that the information processing device is disconnected from the communication target device; and
displaying, on the display, a second screen for performing processing using one or more functions of the communication target device after the communication connection is established with the communication target device.

13. A non-transitory recording medium storing a plurality of instructions which, when executed by one or more processors, causes the one or more processors to perform a method comprising:
activating a first application that operates in cooperation with a second application;
determining a connection state between an information processing device and a communication target device;
receiving an instruction to execute processing to connect to the communication target device from the second application, when the determining determines that the connection state indicates that the communication target device is disconnected from the information processing device;
displaying, on a display, in response to the instruction to connect to the communication target device being disconnected from the information processing device, a screen for receiving an input for connecting to the communication target device;
establishing a communication connection between the information processing device and the communication target device based on the input received on the screen; and
causing the second application to display, on the display, another screen for providing processing using one or more functions of the communication target device after the communication connection is established with the communication target device.

* * * * *